United States Patent [19]
Overbury

[11] 3,728,729
[45] Apr. 17, 1973

[54] RADIO NAVIGATION BEACON INCLUDING ANTENNA ELEMENT COMMUTATION

[75] Inventor: Francis Giles Overbury, Hertfordshire, England

[73] Assignee: International Standard Electric Corporation, New York, N.Y.

[22] Filed: Dec. 22, 1971

[21] Appl. No.: 210,699

[52] U.S. Cl. .................343/108, 343/106, 343/854
[51] Int. Cl. ..............................................G01s 1/16
[58] Field of Search .....................343/106 D, 108 M, 343/854, 844

[56] References Cited

UNITED STATES PATENTS 3,670,337   6/1972   Earp et al. ....................343/106 D

*Primary Examiner*—Benjamin A. Borchelt
*Assistant Examiner*—A. M. Psitos
*Attorney*—C. Cornell Remsen et al.

[57] ABSTRACT

A radio navigation beacon system of the Doppler type having a simplified antenna arrangement. A main array employing 30 array elements spaced at four wavelengths and an auxiliary or reference array comprising 12 reference antenna elements spaced at one-third wavelength, are employed. A source of radio frequency energy is commutated to the separate radiator elements in order to simulate unidirectional or bidirectional constant velocity motion of the source. Navigational information is derived from this ground beacon arrangement by a receiving station as, for example, in an approaching aircraft on the basis that the Doppler shift of frequency observed at the receiving station is proportional to the cosine of the angle of reception with respect to the operating centerline of the system. Means are included for commutating the reference frequency to each reference antenna element, in turn, during the period that each main array element is radiating.

10 Claims, 1 Drawing Figure

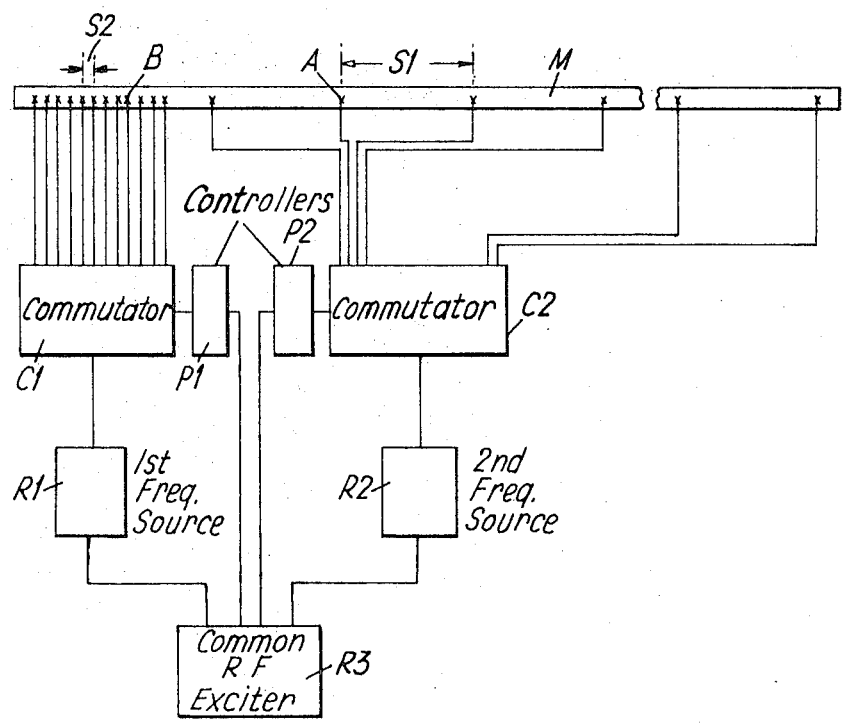

RADIO NAVIGATION BEACON INCLUDING ANTENNA ELEMENT COMMUTATION

BACKGROUND OF THE INVENTION

1. Field of the Invention

This invention relates to radio navigation beacons and, more particularly, to instrument landing systems providing for angle determination with respect to an ideal course or glide path for an aircraft during landing approach.

2. Description of the Prior Art

The present invention constitutes an improvement over basic Doppler instrument landing system arrangements described in U.S. Pat. application Ser. No. 859,915, filed 22 Sept. 1969, now U.S. Pat. No. 3,626,419, and U.S. Pat. application Ser. No. 4,653, filed 21 Jan. 1970, now U.S. Pat. No. 3,670,337. Those patent applications are assigned to the assignee of the present invention.

The aforementioned prior art describes a basic system with variations using linear array radio beacons, in which a source of radio frequency energy is commutated to separate radiator elements in order to simulate unidirectional or bidirectional constant velocity motion of the source. Navigational information is derived from these beacons, as for example, by an approaching aircraft in a landing pattern, on the basis that the Doppler shift of the received radio frequency is proportional to the cosine of the angle which the remote radio receiver subtends with respect to the line of movement (bore sight or centerline) of the source (ground beacon antenna array).

As movement is simulated by the successive commutation of the source to adjacent elements of such a Doppler array, the spacing of these elements is determined by the limiting phase transient which can be tolerated between successive samples of received signal. In general this transient corresponds to a phase jump of 120°. In the case where information is required over a wide angle, this may require adjacent elements in an array to be spaced as close as one-third wavelength.

The accuracy and integrity of such a Doppler navigation system is determined mainly by the array length and, in the case of systems required to furnish angular information to an accuracy of 0.01 degrees, an array length of as much as 120 wavelengths could be required. The realization of a Doppler navigation system to such an accuracy requirement over a wide sector would therefore involve the use of 360 radiator elements. The use of a Doppler array beacon of that size, with its associated commutator and cables, constitutes a prolixity of equipment and introduces possible RF losses detracting from the simplicity of the basic system.

Typically, the linear arrays of the prior art and present systems are oriented so that their radiating elements are distributed along a line normal to the ideal flight path line (for the application of the invention to aircraft final landing approach navigation). Used for the azimuth navigational aspect of such navigation (localizer function), the array would extend horizontally in a line normal to and across the runway centerline. For the elevation (glide path) application, the array would be disposed generally vertically or tilted from vertical by a small angle corresponding to the glide-path angle (measured from the horizontal plane). That glide-path angle is typically on the order of 2° or 3° for aircraft (except VTOL types).

More information as to actual array placements is to be understood from the prior art aforementioned, however, it is useful to bear the physical relationships in mind in understanding the present invention. Thus, in the localizer instrumentation, the approaching aircraft receives energy successively from the commutated elements of the primary array over a changing path length. The said path length is minimum when the aircraft is directly on course during the time it receives energy from the middle element of the primary array. The end elements of the primary array provide the longest path length and throughout the commutation of the primary array the aircraft receives a Doppler component which varies through a point of inflection at the time of reception from the center element. Sense information is provided by the reference array in a manner also explained in the aforementioned prior art.

For purposes of the description hereinafter, the expression "ideal navigational path" refers to either the azimuth or elevation situation and means the on-course line (runway centerline) or correct glide path line, respectively.

The Doppler navigation system discussed above typically operates at a radio frequency of at least 1.0 GHz, and since the maximum Doppler frequency shift involved is of the order of a few KHz, it is necessary in practice to use a reference antenna at the beacon, which radiates a second radio frequency slightly offset from the commutated frequency, e.g. by 20 KHz. The Doppler shift of the frequency of the moving component is then detected as a change on the beat frequency between the moving component and the reference signal. Thus, the indicated change of beat frequency, which bears the navigational information, is determined by the change of path difference between the two paths. With the fixed reference antenna of the above described prior art system, this change of path difference arises solely from the movement simulated by the commutated array.

In order to simplify the overall system, improvements were devised which are hereinafter described.

SUMMARY OF THE INVENTION

According to the invention, there is provided a radio navigation beacon including a first linear array of equally spaced radiating elements, an RF energy commutator provides the RF switching of the first radio frequency signal to each said radiator in turn. A second linear array of equally spaced elements in substantial alignment with the first array has an overall length equal to the spacing between adjacent elements of the first array. Another energy commutator switches (commutates) energy of a second radio frequency signal (different from said first radio frequency signal) to each of the second array elements in succession during the period of excitation of each of the first array elements by the first radio frequency. Commutation to the two arrays is in opposite directions.

BRIEF DESCRIPTION OF DRAWINGS

A single FIGURE depicts the system of the invention in block diagram form.

DESCRIPTION OF THE PREFERRED EMBODIMENT

An embodiment of the invention will now be described with reference to the single FIGURE of the accompanying drawing which shows the beacon system in horizontal form. As aforesaid, there is a substantial reduction in the number of radiator elements required in this beacon, consistent with the accuracy and integrity provided by the already mentioned prior art form of Doppler array having a length of 120 wavelengths (120 $\lambda$). Instead of 360 prior art elements spaced ⅓ $\lambda$ between adjacent elements, the present array (hereinafter termed "primary array") consists of 30 elements, A, with spacing S1 of 4 $\lambda$ between adjacent elements, i.e., the primary array has an overall length of 120 $\lambda$.

Instead of the prior art single fixed reference antenna, there are 12 reference radiator elements, B, arranged as a linear array (hereinafter termed "reference array"), with a spacing S2 of ⅓ $\lambda$ between adjacent radiator elements, i.e., the reference array has an overall length of 4 $\lambda$.

In general, therefore, the length of the reference array is equal to the spacing between adjacent elements of the primary array, and the spacing between adjacent elements of the reference array is equal to the step change of path length required.

The elements of the primary array and the reference array are conveniently mounted in alignment on a common support member M.

The required change of path length (commutation program), generated as 360 steps each of ⅓ $\lambda$, is achieved as follows.

A first radio frequency ($f$) from a first source R1 is commutated in turn by a commutator C1 to the elements of the primary array at a scanning rate determining the apparent velocity of a moving source.

During the time each element of the primary array is radiating at this frequency, a second, slightly offset reference radio frequency ($f_1$) from a second source R2 is commutated in turn by a commutator C2 (in the opposite direction of scan to that of the primary array) to the elements of the reference array.

The drawing also includes an initial radio frequency source or common RF exciter R3 from which are derived, as indicated by the interconnecting lines, both the array frequencies and also the appropriate controlling frequencies to controllers P1 and P2 for the respective commutators. Since these controller functions are merely timed switching, as will be evident hereinafter, their detailed instrumentation will be readily assembled by those skilled in this art.

Identifying the successive elements of the primary array, in the direction of scanning of the primary array, as A1, A2, A3, et cetera, and the successive elements of the reference array, in the direction of scanning of the reference array, as B1, B2, B3, et cetera, the sequence for a single scan is A1, B1; A1, B2; A1, B3;............... A1, B12;
A2, B1; A2, B2; A2, B3;............... A2, B12;
↓      ↓      ↓                      ↓  ↓
A30, B1; A30,B2; A30, B3;..............A30,B12.

This sequence is then reversed, for bidirectional scanning, or repeated for unidirectional scanning. As explained in the above-mentioned Specifications, the reference frequency may be less than $f$ or greater than $f$ with unidirectional scanning, or may alternate between $>f$ and $<f$ according to the direction of scan of the primary array with bidirectional scanning.

This sequence results in the required 360 steps, with the ⅓ $\lambda$ steps being derived as a result of the opposite simulated movement of the elements of the reference array.

In this way, the number of incremental steps available is equal to the product of the number of reference elements and primary elements. In the described embodiment there is a total of 42 antenna radiator elements, as opposed to the 361 elements required in the prior art version.

By suitably choosing the spacing of the elements of the primary array and of the reference array, together with suitable scanning rates for each array, other commutation sequences are possible in addition to the foregoing technique which may be termed "step-and-repeat".

It is to be understood that the foregoing description of specific examples of this invention is made by way of example only and is not to be considered as a limitation on its scope.

What is claimed is

1. In a radio navigation beacon system which simulates motion by electrical sequencing of antenna elements to generate an apparent Doppler frequency component at a receiving station, the combination comprising:

a first source of radio frequency energy of a first frequency;

a first antenna array including a plurality of equally spaced antenna radiating elements disposed in a line at an angle with respect to the ideal navigational path;

first commutating means for successively switching the output of said first source to each of said radiating elements of said first array according to a predetermined pattern;

a second antenna array including a plurality of equally spaced antenna radiating elements disposed in a line at an angle with respect to said ideal navigational path, said second array having an overall length equal to the spacing between adjacent elements of said first array;

a second source of radio frequency energy of a second frequency different from said frequency; and second commutating means for successively switching the output of said second source of radio frequency energy to each of said radiating elements of said second array in succession during the time of energization of each of said first array elements by said energy of said first frequency.

2. Apparatus according to claim 1 in which the elements of said first and second arrays are disposed substantially on the same line.

3. Apparatus according to claim 2 in which said second commutating means is adapted to switch said energy of said second frequency successively among said elements of said second array in the opposite direction along said same line as the direction of switching provided by said first commutating means at any time.

4. Apparatus according to claim 3 in which said angle of said same line along which said first and second arrays are disposed makes an angle of substantially 90° with respect to said ideal navigational path.

5. Apparatus according to claim 3 in which said first array is identified as the primary array and said second array is identified as the reference array, in which said primary array is defined as having an overall length which is an integral number of wavelength times the overall length of said reference array.

6. Apparatus according to claim 5 in which the elements of said primary array are spaced four wavelengths apart and the elements of said reference array are space one-third wavelength apart, whereby said first and second commutating means operate to produce discrete radiated energy path length changes in steps of one-third wavelength.

7. Apparatus according to claim 6 in which said primary array comprises 30 elements and said reference array comprises 12 elements.

8. Apparatus according to claim 5 in which said second frequency is defined as being different from said first frequency by an amount comparable to the Doppler frequencies produced by said commutators, said difference between said first and second frequencies being a small percentage of said first or second frequency.

9. Apparatus according to claim 8 in which said frequency difference is on the order of 20 KHz, whereas said first and second frequencies are on the order of 1.0 GHz.

10. Apparatus according to claim 4 in which means are included for supporting both said primary and reference arrays along said same line, said reference array being spaced a predetermined distance along said same line from one end radiating element of said primary array.

* * * * *